(12) United States Patent
Karam

(10) Patent No.: US 7,903,809 B2
(45) Date of Patent: Mar. 8, 2011

(54) POWER MANAGEMENT FOR SERIAL-POWERED DEVICE CONNECTIONS

(75) Inventor: Roger A. Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1571 days.

(21) Appl. No.: 10/982,383

(22) Filed: Nov. 5, 2004

(65) Prior Publication Data

US 2006/0100799 A1 May 11, 2006

(51) Int. Cl.
*H04M 1/00* (2006.01)
*H04M 9/00* (2006.01)

(52) U.S. Cl. ......................................................... 379/413

(58) Field of Classification Search .................... 379/413
See application file for complete search history.

(56) References Cited

U.S. PATENT DOCUMENTS

| | | |
|---|---|---|
| 4,835,737 A | 5/1989 | Herrig et al. |
| 5,122,691 A | 6/1992 | Balakrishnan |
| 5,148,144 A | 9/1992 | Sutterlin et al. |
| 5,237,511 A | 8/1993 | Caird et al. |
| 5,268,592 A | 12/1993 | Bellamy et al. |
| 5,289,359 A | 2/1994 | Ziermann |
| 5,386,567 A | 1/1995 | Lien et al. |
| 5,406,260 A | 4/1995 | Cummings et al. |
| 5,461,671 A | 10/1995 | Sakuragi et al. |
| 5,483,574 A | 1/1996 | Yuyama |
| 5,491,804 A | 2/1996 | Heath et al. |
| 5,531,612 A | 7/1996 | Goodall et al. |
| 5,608,792 A | 3/1997 | Laidler |
| 5,613,130 A | 3/1997 | Teng et al. |
| 5,639,267 A | 6/1997 | Loudermilk |
| 5,726,506 A | 3/1998 | Wood |
| 5,742,513 A | 4/1998 | Bouhenguel et al. |
| 5,758,102 A | 5/1998 | Carey et al. |
| 5,775,946 A | 7/1998 | Briones |
| 5,790,391 A | 8/1998 | Stich et al. |
| 5,790,873 A | 8/1998 | Popper et al. |
| 5,793,987 A | 8/1998 | Quackenbush et al. |
| 5,796,185 A | 8/1998 | Takata et al. |
| 5,808,660 A | 9/1998 | Sekine et al. |
| 5,809,256 A | 9/1998 | Najemy |
| 5,834,925 A | 11/1998 | Chesavage |

(Continued)

FOREIGN PATENT DOCUMENTS

WO WO 96/23377 8/1996

OTHER PUBLICATIONS

International Search Report for International Application No. PCT/US2005/036329, date of mailing Sep. 4, 2006.

(Continued)

*Primary Examiner* — Alexander Jamal
(74) *Attorney, Agent, or Firm* — BainwoodHuang

(57) ABSTRACT

A method and apparatus for managing an Inline Power relationship between and among a first network device acting as power sourcing equipment (PSE) to provide Inline Power to a second Powered Device (PD) and a third device. In one aspect of the invention, the powered device(s) and the third device are powered (at least in part) by the PSE using inline power from at least one port (which may include more than one PSE) and they are powered over one or more sets of cables.

66 Claims, 13 Drawing Sheets

U.S. PATENT DOCUMENTS

| | | | |
|---|---|---|---|
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,986,071 | B2 | 1/2006 | Darshan et al. |
| 7,089,126 | B2 | 8/2006 | Muir |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 2003/0202655 | A1* | 10/2003 | Nattkemper et al. .......... 379/413 |
| 2004/0049321 | A1 | 3/2004 | Lehr et al. |
| 2004/0073597 | A1 | 4/2004 | Caveney et al. |
| 2004/0146061 | A1 | 7/2004 | Bisceglia et al. |
| 2004/0260794 | A1 | 12/2004 | Ferentz et al. |
| 2005/0132240 | A1 | 6/2005 | Stineman, Jr. et al. |
| 2005/0197094 | A1 | 9/2005 | Darshan et al. |
| 2005/0257262 | A1 | 11/2005 | Matityahu et al. |

OTHER PUBLICATIONS

"3Com User Guide" 3Com Network Jack, Model NJ200, Version 1.0, 3Com, Sep. 2002.

Lynn, K., "Universal Serial Bus (USB) Power Management", Wescon Conference, IEEE, pp. 194-201, Sep. 1998.

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036392, date of mailing Mar. 10, 2006.

International Preliminary Report on Patentability Application No. PCT/US2005/036328, date of mailing May 18, 2007.

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

* cited by examiner

POWER MANAGEMENT FOR SERIAL-POWERED DEVICE CONNECTIONS

STATEMENT OF RELATED CASES

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab.

This patent may also be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may also be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John Wakerly.

This patent may also be considered to be related to commonly owned U.S. patent application Ser. No. 10/981,202 filed on Nov. 3, 2004 and entitled "PHY-Based Current Imbalance Compensation for Magnetics in a Wired Data Telecommunications Network" in the names of inventors Roger A. Karam and John F. Wakerly.

This patent may also be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may also be considered to be related to commonly owned U.S. Pat. No. 6,541,878 entitled "Integrated RJ-45 Magnetics with Phantom Power Provision" in the name of inventor Wael William Diab.

This patent may also be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline Power is also available through techniques that are non-IEEE 802.3 standard compliant as is well known to those of ordinary skill in the art.

In order to provide regular Inline Power to a PD from a PSE it is a general requirement that two processes first be accomplished. First, a "discovery" process must be accomplished to verify that the candidate PD is, in fact, adapted to receive Inline Power. Second, a "classification" process must be accomplished to determine an amount of Inline Power to allocate to the PD, the PSE having a finite amount of Inline Power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some Inline Power (not "regular" Inline Power, i.e., reduced voltage and limited current) as the discovery signal to measure resistance across the two pairs of conductors to determine if the 25,000 ohm resistance is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular Inline Power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | 15.4 |

The discovery process is therefore used in order to avoid providing Inline Power (at full voltage of −48 VDC) to so-called "legacy" devices which are not particularly adapted to receive or utilize Inline Power.

The classification process is therefore used in order to manage Inline Power resources so that available power resources can be efficiently allocated and utilized.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

A method and apparatus for managing an Inline Power relationship between and among a first network device acting as power sourcing equipment (PSE) to provide Inline Power to a second Powered Device (PD) and third or more devices. In one aspect of the invention, the powered device(s) and the third device are powered (at least in part) by the PSE using inline power from at least one port (which may include more than one PSE) and they are powered over one or more sets of cables.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at power management for serial-powered device connections. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
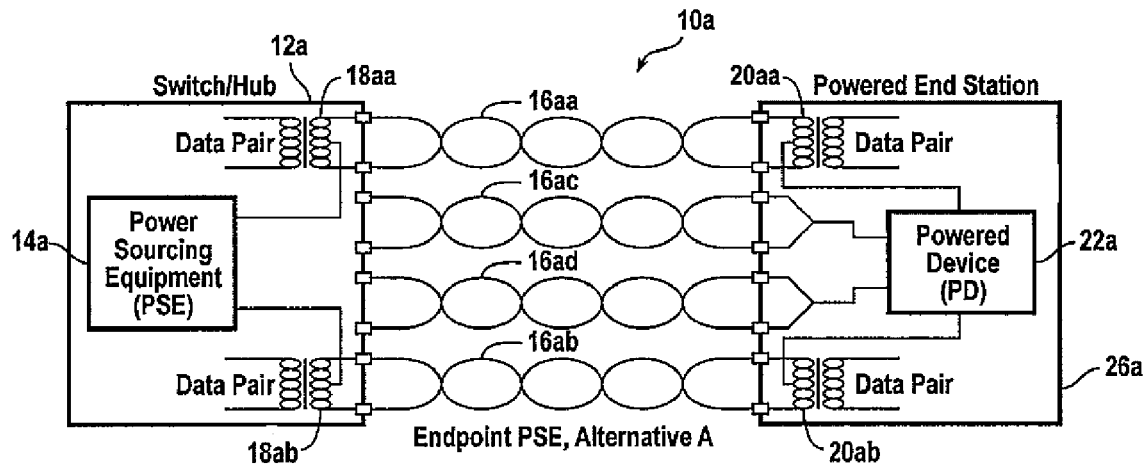
FIGS. 1A, 1B, 1C, 1D and 1E are electrical schematic diagrams of portions of data telecommunications networks in accordance with the prior art.
Figure 1B:
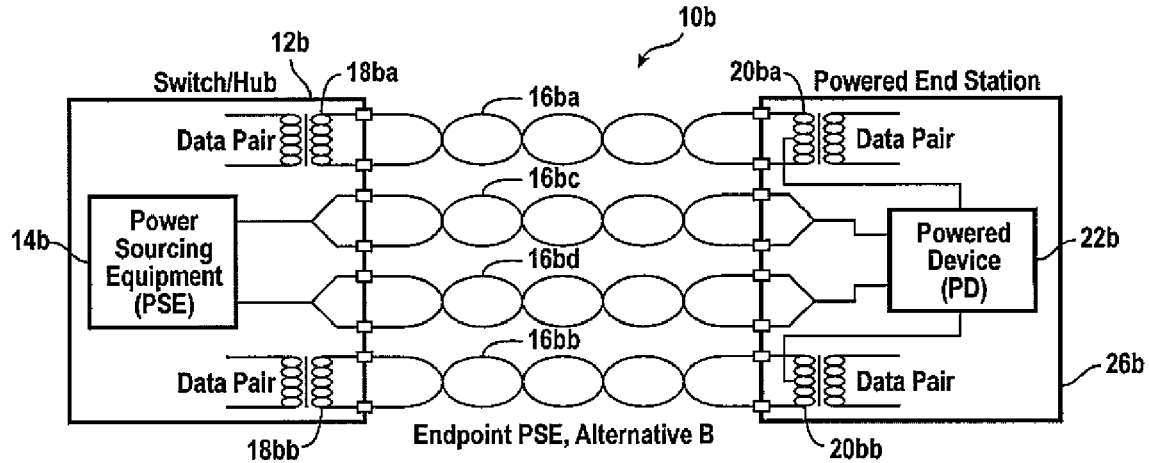
Figure 1C:
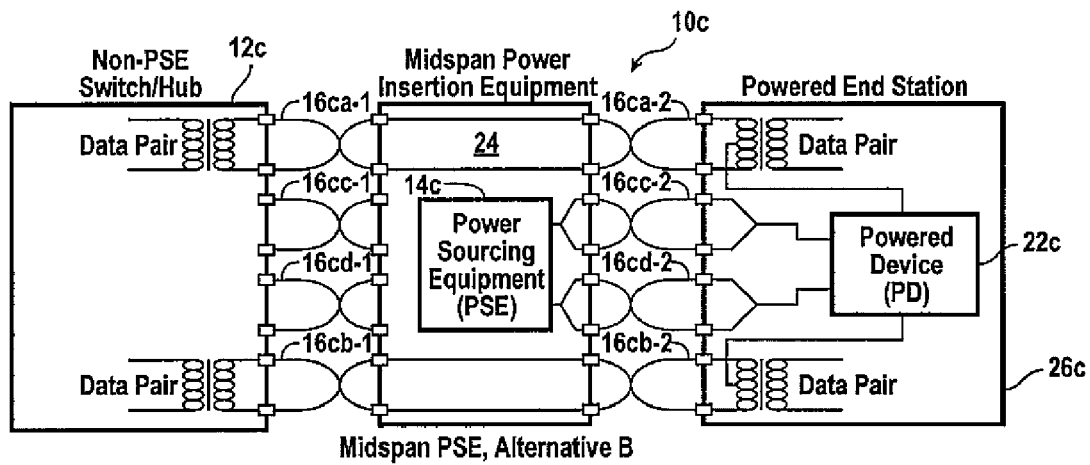
Figure 1D:
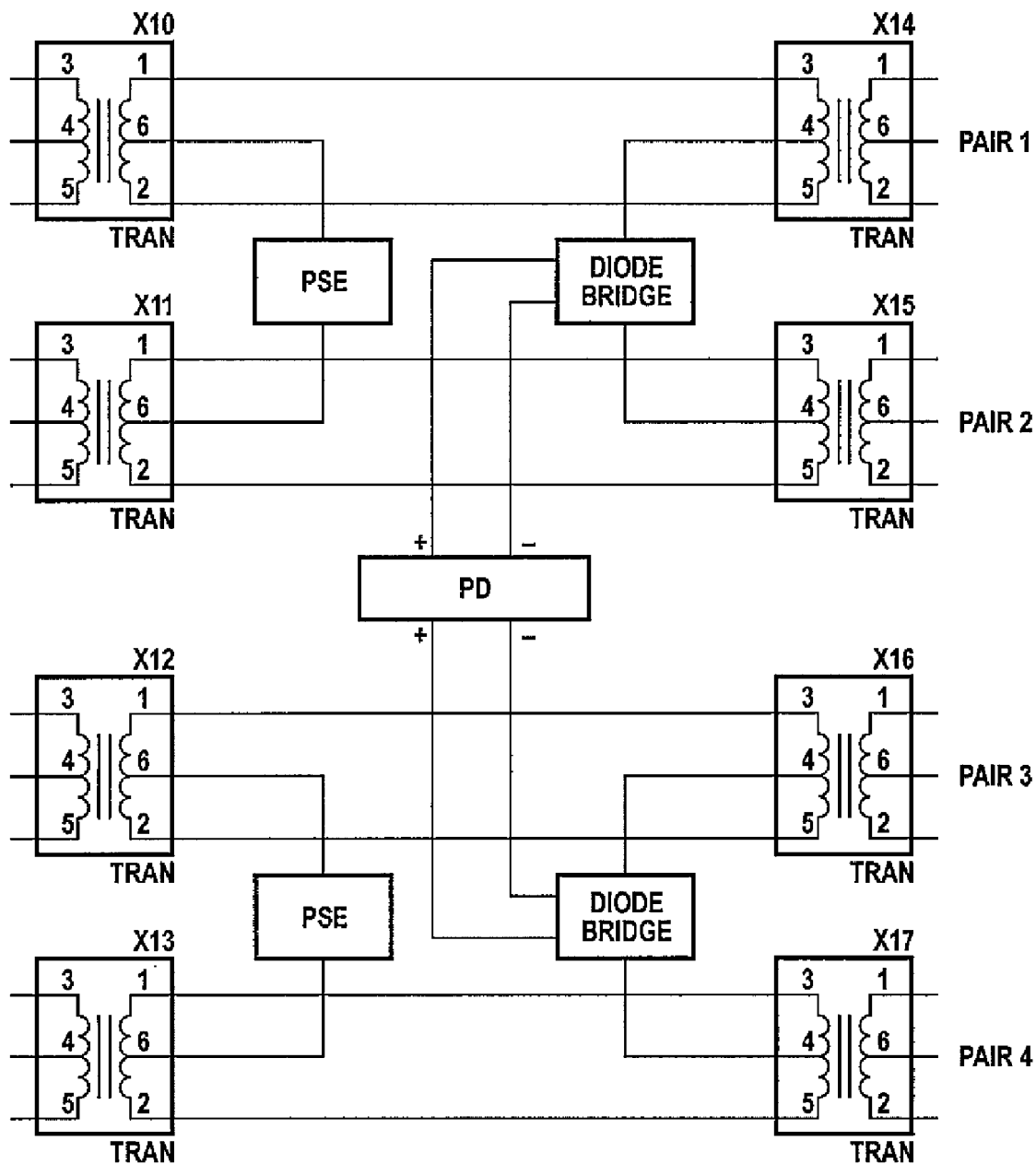
Figure 1E:
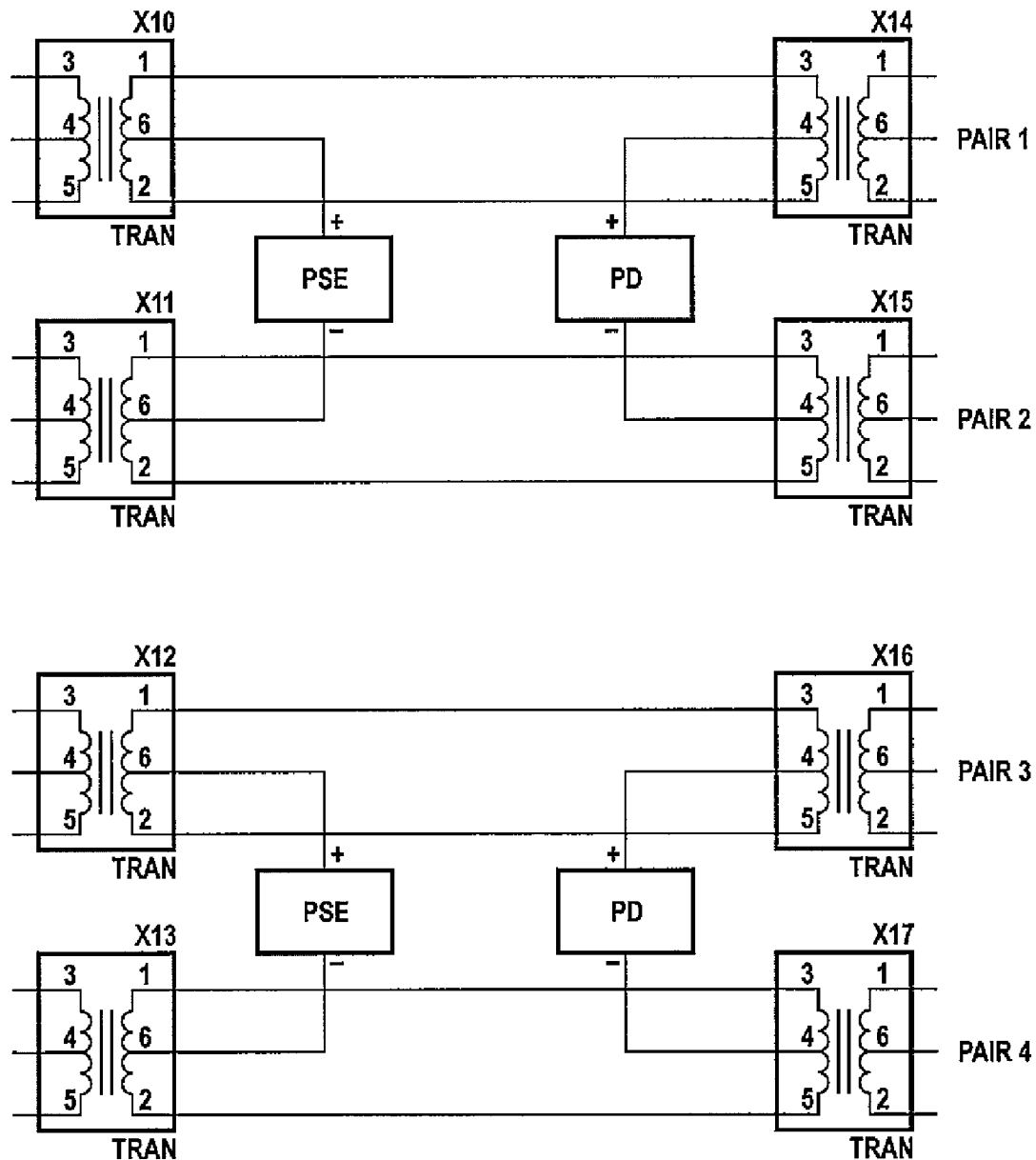
Figure 2A:
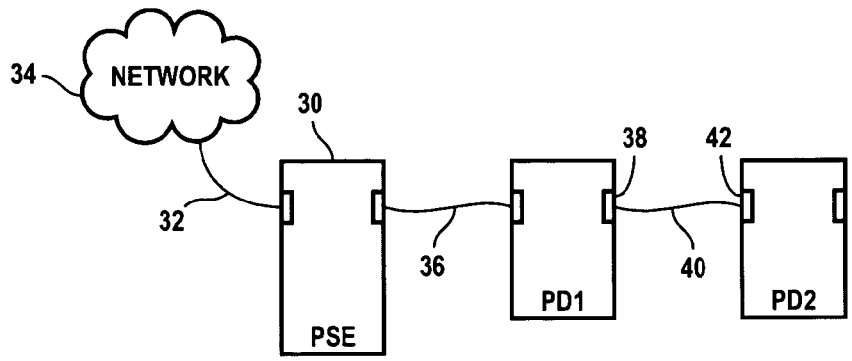
FIG. 2A is a system block diagram of a system in accordance with an embodiment of the present invention, the system comprising a first device, a second device and a third device in a wired data telecommunications network, the first device configured as power sourcing equipment (PSE), the second device having a first power requirement and configured as a powered device (PD) and coupled via a first wired link to the first device, and the third device having a second power requirement and coupled via a second wired link to the second device.

The present invention is directed to a method and apparatus for managing an Inline Power relationship between a network device and a Powered Device (PD) where the network device is acting as power sourcing equipment (PSE) to provide Inline Power to a first PD (PD1) which is, in turn, powering another PD (PD2). The invention also permits powered devices of various kinds to obtain power from a PSE without the permission or interaction of an intermediate device, i.e., straight from the PSE. The IEEE 802.3af standard is directed to the relationship between a single PSE and a single PD. In the situation to which the present invention is directed, there is a PSE-PD relationship, however, there is an additional PD to PD, PD to pseudo-PD, or a PSE to multiple independent PD relationship which affects the underlying PSE-PD relationship. The various relationships are briefly diagrammed in FIG. 2A. In the block diagram of FIG. 2A, a network device 30 configured as PSE is coupled via a first link 32 to a network 34. Link 32 may be any appropriate network link such as Ethernet, fiber, wireless, Satellite, terrestrial broadband wireless, digital subscriber line (DSL) and the like. Network 34 may be a local area network (LAN) such as in an office; a metropolitan area network (MAN) or a wide area network (WAN) such as the Internet or a corporate Intranet or the like.

PSE 30 is coupled to a PD designated PD-1 via link 36 in a conventional manner. PD-1 may be any powered device or it may be a pseudo-PD such as that illustrated in FIGS. 4A and 4B. PD-1 may have an interface 38 and coupled thereto may be a wired link 40 to interface 42 of powered device PD-2.

In accordance with one embodiment of the present invention when PD-1 negotiates for power with PSE 30, it would be desirable to include in the negotiation the desire for power which PD-2 may have. For example, using conventional IEEE 802.3af standard Inline Power, PD-1 may be a class 1 powered device (roughly 4 Watts) and PD-2 may also be a class 1 PD. As a result, the need at PD-1 might be 8 watts which would require PD-1 to negotiate as a class 3 device (about 15 watts) in order to make sure it has at least 8 watts available to it. Accordingly, a communication must take place between PD-2 and PD-1 so that PD-1 knows how much power to request.

This communication may take place in any of a number of ways. First, it may use conventional IEEE 802.3af standard PSE-PD communications protocols by treating the interface 38 on PD-1 as a PSE and the interface 42 of PD-2 as a PD. In this way, as long as the PD-2 to PD-1 link is up and communicating before the PD-1 to PSE 30 power relationship is established PD-1 will be able to configure itself to tell PSE 30 that it has a class which represents the combined power requirements of PD-1 and PD-2. Unfortunately, if PD-2 gets attached to and removed from PD-1 (as if PD-1 is a laptop and PD-2 is some peripheral device such as a cell phone, PDA, another laptop, or the like) then PD-1's power requirements will change from time to time, a situation not presently addressed by the IEEE 802.3af standard. To respond to such a situation, PSE 30 may be provisioned with the capability to periodically adjust the Inline Power relationship with its attached PDs.

FIGS. 2B, 2C, 2D and 2E depict various configurations of a one PSE to plural PD arrangement in accordance with embodiments of the present invention. In each case one or more cables are coupled to the same port of a network device (such as a switch) and use one or more PSEs available on that port to power PDs.

Figure 2B:
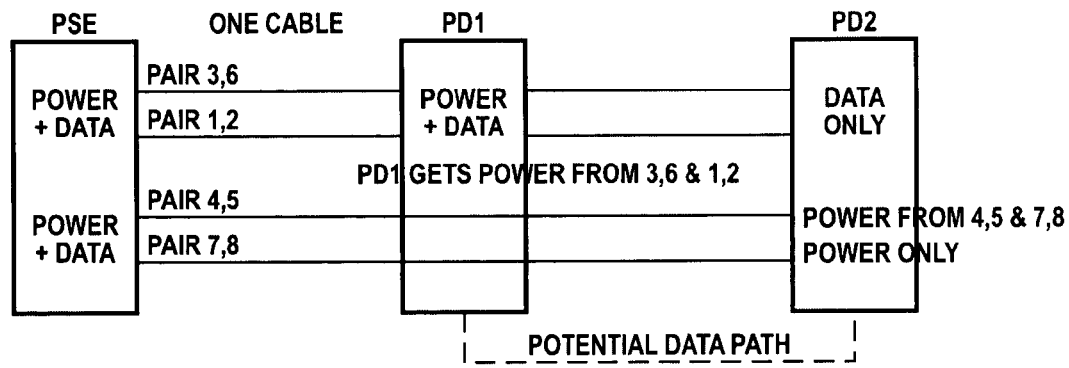
FIGS. 2B, 2C, 2D and 2E are system block diagrams of systems providing inline power to multiple devices in accordance with various embodiments of the present invention.

FIG. 2B is a diagram of a system comprising a PSE and a first PD (PD1) and a second PD (PD2). A single 8-conductor cable can couple power and data (or just power) from the PSE to PD1. In the embodiment of FIG. 2B, a first cable having four pairs of conductors couples PD1 to the PSE and a second such cable couples PD2 to PD1. PD1 receives power and data from the PSE over the pair 3, 6 and pair 1, 2 (4 conductors). Pair 4, 5 and pair 7, 8 pass through PD1. PD2 is connected to PD1, for example with an RJ-45 type connector, and receives data over pair 3, 6 and pair 1, 2. Power is provided to PD2 over inline power provided on pairs 4, 5 and 7, 8. In accordance with this embodiment, data is not provided to PD2 over the pairs 4, 5 and 7, 8. An optional "potential data path" as shown may be provided for communications (if needed) between PD1 and PD2. This could be a wireless connection, a common mode data communication path, an Ethernet data connection, or the like. The PSE shown may be a single PSE or a pair of PSEs associated with the same port of a network device or other PSE-type device. Note that typical 10/100 Base T Ethernet utilizes the 3, 6 and the 1, 2 pairs of an 8 conductor Ethernet cable. The 4, 5 and 7, 8 pairs are normally unused in this application although they are used in 1000 Base T (and higher) Ethernet.

Figure 2C:
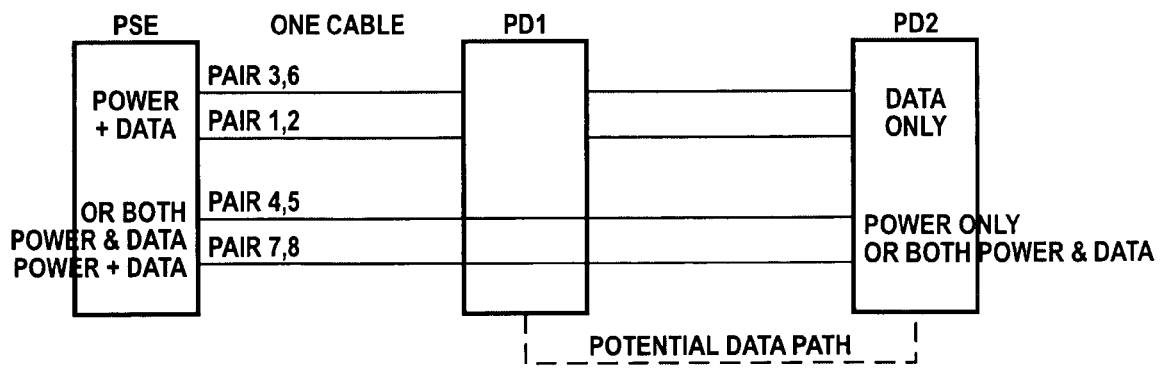

In FIG. 2C the arrangement is much like that illustrated in FIG. 2B except that power and data are passed to PD2 from the PSE via the unused pairs 4, 5 and 7, 8.

Figure 2D:
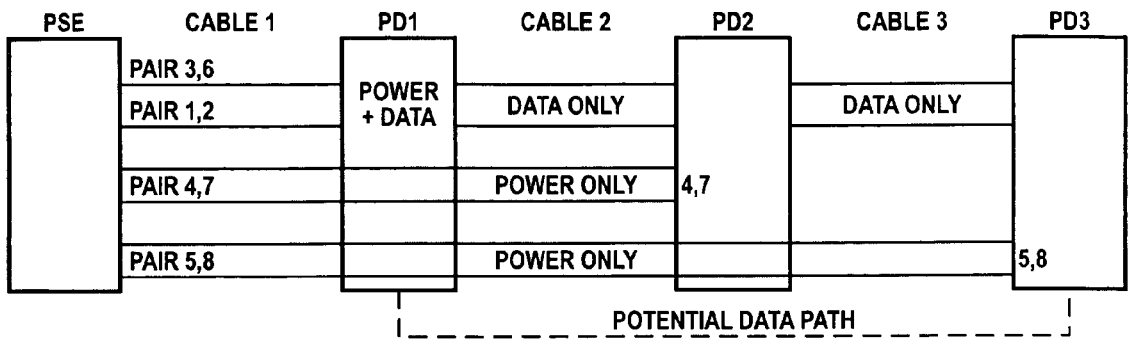

In FIG. 2D an arrangement is shown where a PSE provides power and data to three PDs: PD1, PD2 and PD3. This is again accomplished over a series of single 8 conductor (4 pair) cables daisy-chained between the various devices. Pair 3, 6 and pair 1, 2 provide data connectivity to PD1 (via a first cable coupling the PSE and PD1), then to PD2 (via a second cable coupling PD1 and PD2), then to PD3 (via a third cable coupling PD2 and PD3). These pairs also provide inline power to PD1. Power is provided to PD2 and PD3 as follows. For example, an inline power signal is provided between pair 4,5 (+) and pair 7, 8 (−). PD2 takes its power by coupling to conductors 4(+) and 7(−) (although others could be used) and PD3 takes its power by coupling to conductors 5(+) and 8(−) (although others could be used). This power coupling may be accomplished through an inductor (to provide a high-impedance AC (alternating current) path) or directly without an inductor (since there is no data on these lines). A potential data path may couple PD1 and PD3 as shown (or other devices), if desired. Such potential data paths may be implemented in any convenient manner.

Figure 2E:
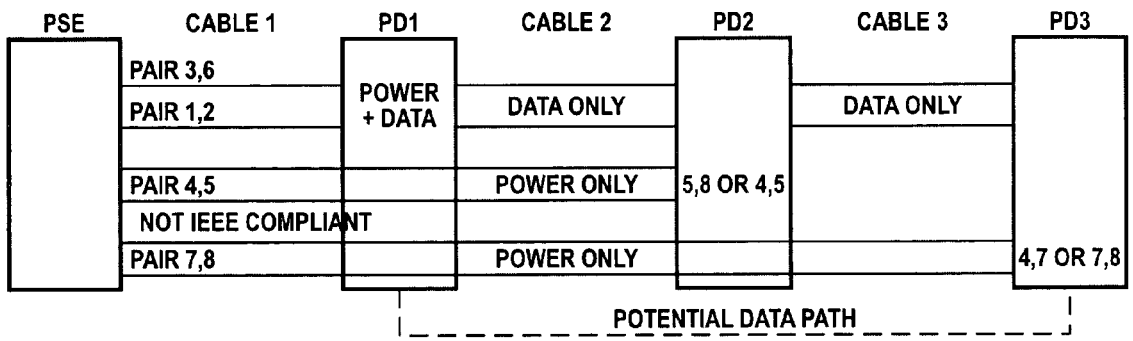

In FIG. 2E an approach that is not compliant with the IEEE 802.3af standard is illustrated. Here pair 4, 5 is used with conductor 4 carrying, e.g., the +leg of the power circuit to PD2 and conductor 5 carrying the −leg of the power circuit back from PD2. Similarly the pair 7, 8 is used so that conductor 7 carries the +leg of the power circuit to PD3 and conductor 8 carries the −leg of the power circuit back from PD3. This is not common mode inline power as defined in the IEEE 802.3af standard, and, because less wire is used, the DC resistance (DCR) of the cable increases. A potential data path may couple PD1 with PD3 as shown, if desired. Such potential data paths may be implemented in any convenient manner.

Figure 3:
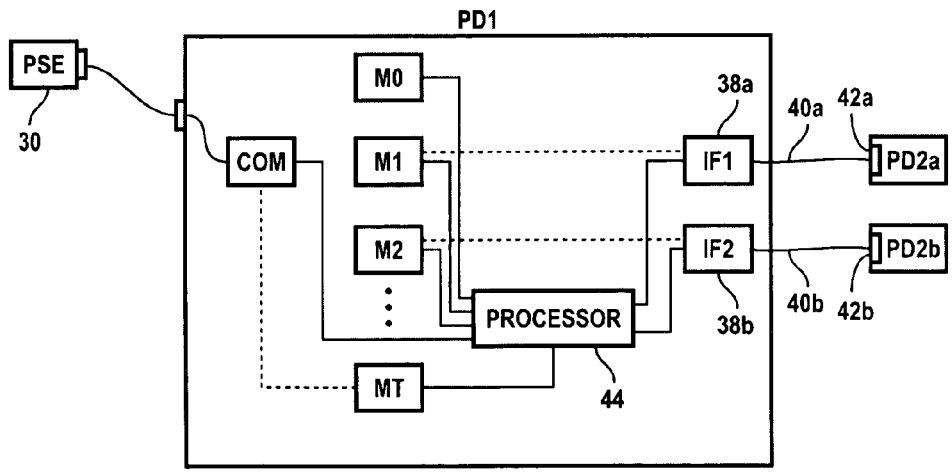
FIG. 3 is a block diagram of a device in accordance with the second device of FIG. 2A in accordance with an embodiment of the present invention.

Turning now to FIG. 3 a block diagram illustrating some of the functions carried out by PD-1 is shown. Since PD-1 may be coupled to one or more devices which are, in turn, powered by it, a pair of interfaces, IF1 and IF2 are shown. PD-1 may, of course, have zero, one or more devices coupled to it at any given time and a device intended to have only a single device coupled to it is intended to be within the scope of the present invention. PD-1 communicates with one or more PD-2 devices (e.g., PD-2a and PD-2b) via interfaces IF1, IF2, etc. It obtains a power requirement, and in one embodiment of the present invention, stores that power requirement in a memory store M1, M2 corresponding to the respective interface for the powered device. In an embodiment of the present invention, PD-1 may store its own power requirement in memory M0. A processor 44 associated with PD-1 controls the interfaces IF1, IF2 in a conventional manner and calculates a total power requirement for PD-1 and its attached devices (based on the contents of memory stores M0, M1, etc.) and, in an embodiment of the present invention, stores that total power requirement in some appropriate form, such as a class number or a representation of a class number or a representation of an actual power requirement in memory store MT. A communications block denoted "COM" is provided to permit PD-1 to communicate its total power requirement to PSE 30. This may be done in a conventional manner using PHY-PHY signaling as contemplated by the IEEE 802.3 Ethernet standard. It may be carried out wirelessly using any appropriate wireless telecommunications technology and any appropriate encoding and modulation system to convey the information over the wireless link to PSE 30. An example of such a scheme would be the well-known "WI-FI" or IEEE 802.11 a, b or g wireless standard, although the invention is not intended to be limited to that approach. In another embodiment of the present invention the information may be signaled from PD-1 to PSE 30 by current or voltage modulating the power supply link over the wired connection between PD-1 and PSE 30. Such a scheme is described in detail in commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab. That application is hereby incorporated herein by reference as if set forth fully herein.

Accordingly, attached powered devices may now communicate their power requirements to an intermediate powered device which can calculate a total power requirement and use that to negotiate a total power package with an attached PSE.

Figure 4A:
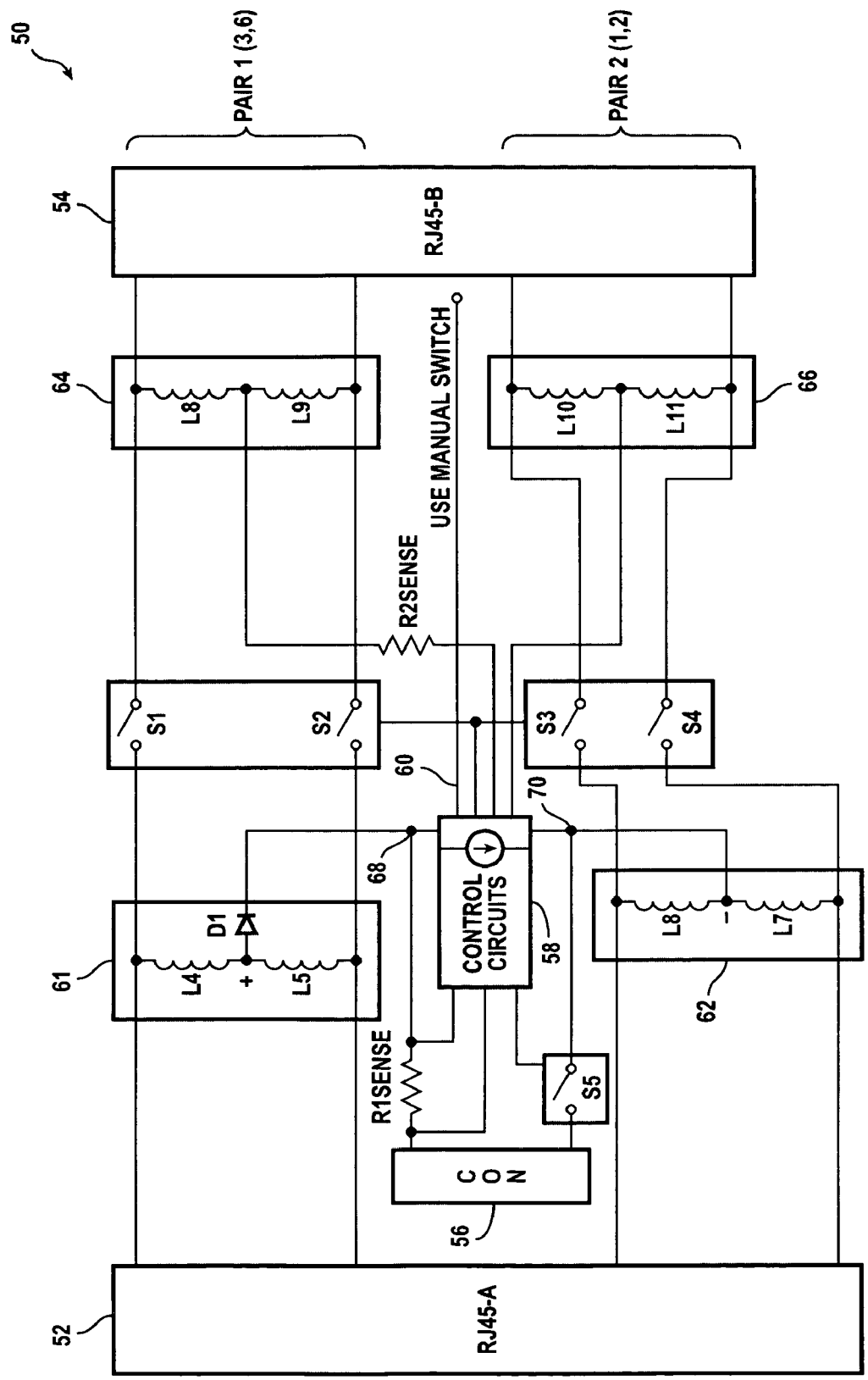
FIG. 4A is an electrical schematic diagram of a device in accordance with another embodiment of the present invention.

Turning now to FIG. 4A, another embodiment 50 of the present invention is illustrated in schematic form. The device 50 of FIG. 4A is a power tap dongle. It comprises a first connector 52 which may, in an embodiment of the present invention, be an RJ-45 type connector of the female or male type, as appropriate to the application (or it may be any other suitable network connector). It also includes a second connector 54 which may be of similar type. In one embodiment of the present invention first connector 52 is a female type RJ-45 connector and second connector 54 is a male type RJ-45 connector so that an Ethernet cable with a male end may plug into first connector 52 and connector 54 may plug into a female RJ-45 connector such as one coupled to an Ethernet port of a laptop computing device. First and second pairs of conductors (pair 1 (3,6) and pair 2 (1,2)) cross device 50 to move data and power between first connector 52 and second connector 54. There is a third connector 56 which may, in one embodiment of the present invention, be a keyed connector adapted to receive the power supply connector of a particular cellular phone or some other connector designed to receive power such as a small device requiring power. Third and fourth pairs of conductors (as in a four-pair cable) may also be accommodated either with pass-through conductors or with circuitry similar to that provided for pair 1 and pair 2.

In the device 50 of FIG. 4A, first connector 52 is adapted to be coupled to a PSE port. The device 56 is adapted to couple data and power from a first and a second pair of conductors associated with first connector 52 across the device to second connector 54. In a first mode of operation the device 50 is coupled via first connector 52 to a port of a PSE device (not shown in FIG. 4A). In order for the PSE port to supply power to device 50, the PSE port must see the proper identity network characteristics. In accordance with the IEEE 802.3af standard this may be a 25,000-ohm resistance in response to certain discovery voltage signals applied to the network cabling. Alternatively, it may be some other identity network which responds to a probing signal in a known way to authorize application on inline power. In the first mode of operation, the second connector may or may not be coupled to another cable and the third connector may or may not be coupled to another device (such as a cell phone to be charged). Where no device is to be coupled to second connector 54 it is desirable to provide no inline power to second connector 54 unless and until a device exhibiting the correct identity network characteristics is present because to do so might expose a device to inline power that was not specifically designed to accept inline power with unpredictable consequences. In this case, it might, however, be desirable to provide power to third connector 56 as it might be configured to power a device such as a cell phone charging circuit or the like. In such a case, a manual power-on switch may be provided to provide a signal on line 60 to control circuit 58. Activating the manual power-on switch would send a signal to the control circuit (sometimes referred to as a controller) telling it to close switch S5 and thereby provide inline power to third connector 56. In one embodiment of the present invention controller 58 would keep switch S5 closed only while current was being drawn from third connector 56 so that if the device were unplugged from third connector 56 the power would turn off. In accordance with another embodiment of the present invention, the power may always be available at the third connector 56. Optionally, a DC-DC power converter may be provided between third connector 56 and the inline power signal at nodes 68 and 70 to provide a different voltage to a device coupled to third connector 56 rather than the nominal voltage provided by the inline power signal (nominally −48 VDC+/− and 0V floating return in the case of inline power over Ethernet).

In accordance with one embodiment of the present invention controller 58 operates to provide an identity network signal back to a PSE coupled with first connector 52 so that inline power may be provided under appropriate circumstances. In one embodiment of the present invention it is adapted to act as a PSE device to determine if an attached device at second connector 54 has an appropriate identity network so that inline power may be provided to it. If it does not verify that such an attached device is entitled to receive inline power, it may simply open (or leave open) switches S1, S2, S3 and S4 thereby cutting off data and inline power to second connector 54. Power is obtained from pair 1 and pair 2 by auto transformer circuits (or equivalent center-tapped transformers) 61 and 62. Similar circuits 64 and 66 are used to inject a query signal into second connector 54 and to receive its response. Alternately, switches S1, S2, S3 and S4 could be replaced with DC blocking capacitors or a magnetic with a high impedance to DC current which would allow data signals to pass but would block inline power signals.

Figure 4B:
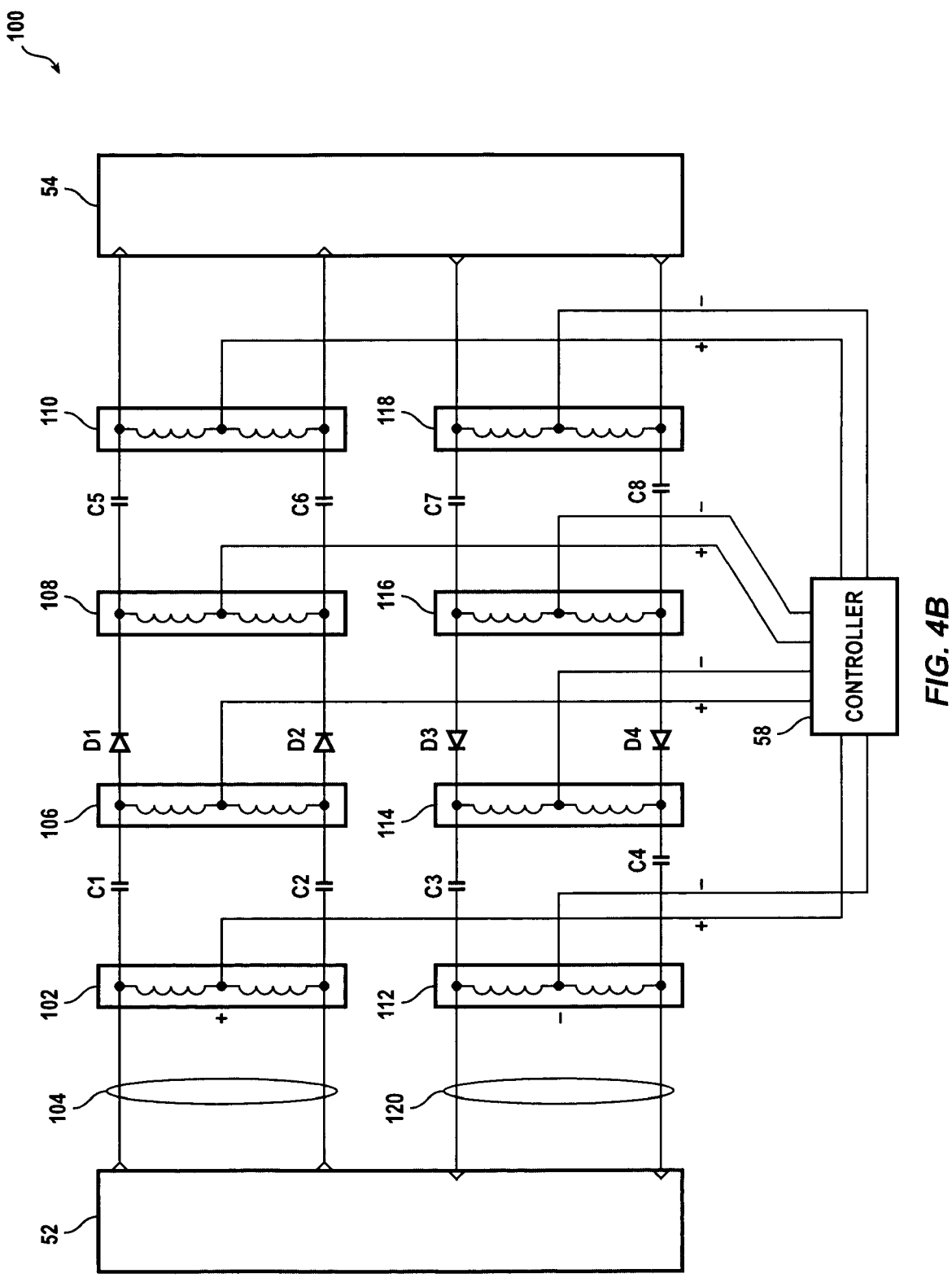
FIG. 4B is an electrical schematic diagram of an alternative configuration of a portion of the circuit of FIG. 4A.

Turning now to FIG. 4B, a modification 100 to a portion of the circuitry of FIG. 4A which eliminates the need for switches S1, S2, S3 and S4 and replaces them with biased signal diodes (D1-D8) and DC blocking capacitors (C1-C8) is illustrated. This configuration conducts forward-biased power and, when forward biased, conducts data signals. Center-tapped magnetic device 102 (which may be a center-tapped transformer or a center-tapped configuration of inductors such as a pair of 2 mH inductors) couples an inline power signal on conductor pair 104 to controller 58. Conductor pair 104 may be a 100 ohm characteristic impedance transmission line as used in Ethernet applications. DC blocking capacitors C1 and C2 block DC power flow on pair 104. Center-tapped magnetic device 106 re-inserts power on pair 104 to forward bias diodes D1 and D2 to permit data on pair 104 to pass. Removing this bias stops data flow. Center-tapped magnetic device 108 constitutes the return for diode bias power provided with magnetic device 106. DC blocking capacitors C5 and C6 stop any diode biasing power from continuing along pair 104. Center-tapped magnetic device 110 reinserts inline power if controller 58 decides to do so, thus providing Inline Power to connector 54. The return circuit on pair 120 operates in mirror fashion.

A device such as that just described would be helpful to people who have a need to charge cellular phones or power other low-power equipment from the inline power available on network cabling. It would also be useful in situations where low-power sensors (such as IP television cameras) need to be wired in a daisy chain configuration and powered from a wired network using inline power.

In accordance with this embodiment of the present invention, controller 58 also must handle inline power negotiations for device 50. Where switches S1, S2, S3 and S4 are used instead of blocking capacitors, controller 58 must simply negotiate for its own power requirements and, when switches S1, S2, S3 and S4 are closed, a device coupled to second connector 54 will be directly connected to a PSE coupled to first connector 52, and using a common mode signaling scheme such as that set forth in detail in commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab may be used for adjusting the inline power provided to first connector 52. Alternatively, device 50 could simply ask for the maximum power available, or some lesser amount, and the circuitry of device 50 and any attached devices would make do with that power level. Where DC blocking capacitors are used instead of switches S1, S2, S3 and S4, a scheme such as that described above may be used whereby attached PDs negotiate with PD 50 which, in turn, negotiates with an attached PSE for power in light of information communicated to PD 50.

In accordance with yet another embodiment of the present invention, a device such as device 50 of FIG. 4A (or device 100 of FIG. 4B or device 70 of FIG. 5) may (referring to FIG. 4A) be coupled via first connector 52 to a PSE capable of supplying inline power. The PSE may provide a low power (idle) POE signal (e.g., up to approximately 5v at a relatively small current) without violating present IEEE 802.3af standards. This low power level could be used to run low power circuitry or bias signal diodes and the like so that AC (alternating current) data signals may pass between connectors 52 and 54, for example, without regular Inline Power being available. When the PSE periodically enters a discovery cycle and applies a higher voltage signal (more than 5V but less than the nominal inline power signal) to test for the presence of an IEEE 802.3af identity network, device 50 would sense this intermediate condition and temporarily decouple itself from the inline power so as not to interfere with the discovery process between a device attached to second connector 54 and the PSE coupled to first connector 52. This is important because the resistances used for identity network discovery in accordance with the IEEE 802.3af standard (e.g., 25,000 ohms) are relatively high and the resulting currents through them are relatively small (on the order of a mA or less). Controller 58 could carry out this process by switching to a rechargeable battery or large capacitor for temporary operating power and turning off switch S5 while leaving switches S1, S2, S3 and S4 closed (these may be implemented as normally closed switches for convenience in some applications) so that the PSE and the potential PD coupled to second connector 54 may communicate. Alternatively controller 58 could be configured to shut off entirely when the inline power voltage is more than a small level (around 5V) and less than the nominal level (around −48 VDC) leaving switches S1, S2, S3 and S4 closed and switch S5 open when it is depowered. So, in this version, a device like that of device 50 in FIG. 4A would operate on a low power form of inline power from a PSE coupled to first connector 52 and would stop drawing inline power when the inline power voltage went out of the range associated with the low power mode (e.g., to enter a discovery mode or a classification mode) but would again draw inline power when the inline power either returned to the low voltage associated with the low power mode or when the inline power went to the much higher voltage level associated with normal inline power (e.g., 48VDC). It would stop drawing power during discovery and classification modes of operation because to do so could interfere with the return current sensing which is a part of the inline power discovery process. See the discussion related to FIG. 6 below. If desired, such a device could draw no current at the higher inline power level where the higher voltage is supplied.

In one embodiment of the FIG. 4A device 50 a switch is included to provide a switch signal on line 60. This would be used for situations where it is desirable to provide power to the third connector 56 while nothing is coupled to the second connector 54. Activating the switch places switches S1, S2, S3 and S4 into the open state so that second connector 54 has no data and no power. It also causes the controller 58 to present an appropriate identity network across the various pairs of the wired data telecommunications network so that a PSE coupled to the first connector 52 applies inline power which can then be applied to third connector 56 either directly or through an appropriate DC-DC power converter (to change the voltage applied to the third connector 56 to a desired level). Removal of the device coupled at third connector 56 removes the current drain which may, in an embodiment of the present invention, cause controller 58 to stop requesting inline power from the PSE coupled to first connector 52. Accordingly, switches S1, S2, S3 and S4 would then close and switch S5 would open so that data was conducted between connectors 52 and 54.

Figure 5:
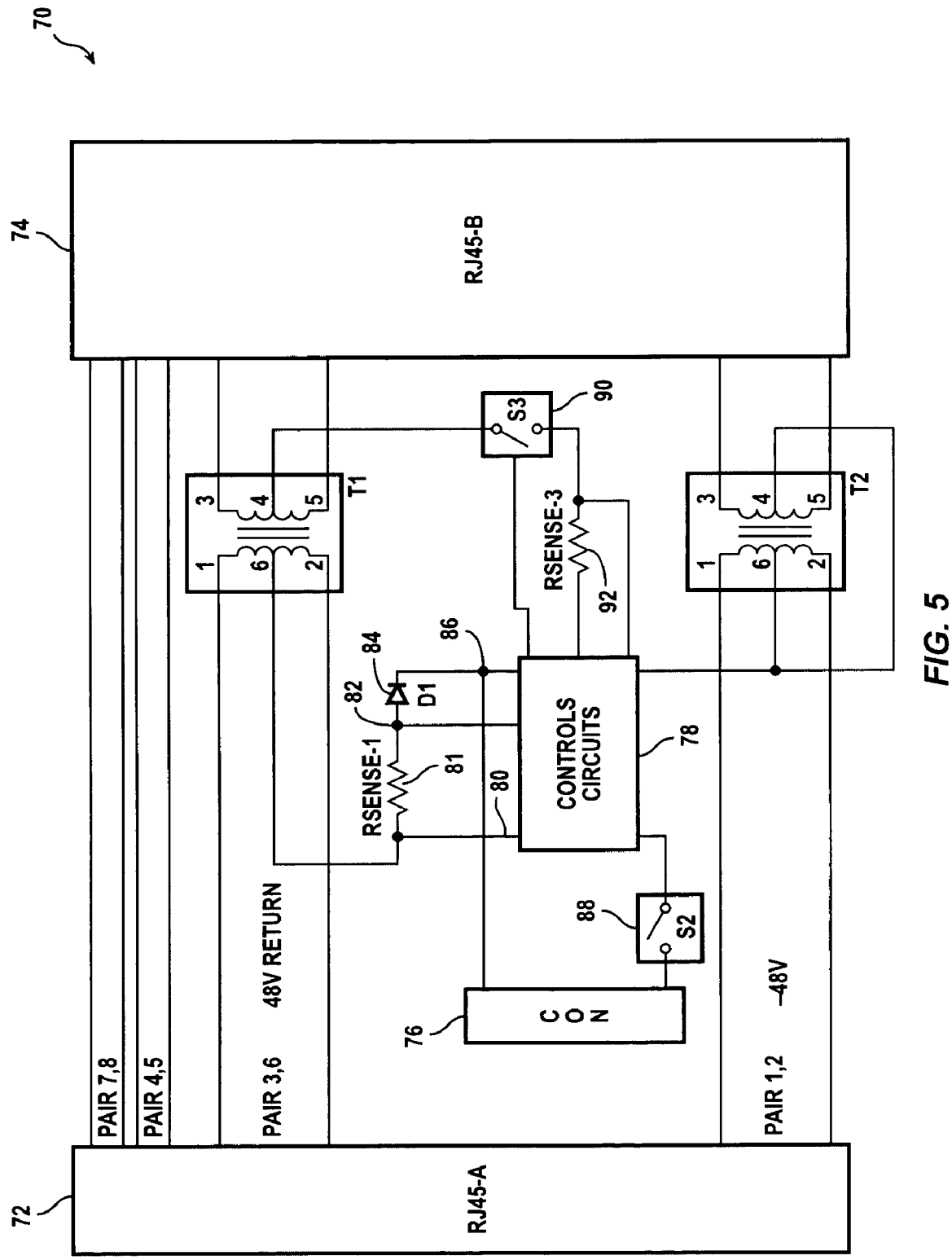
FIGS. 5, 6, 7, 8 and 9 are electrical schematic diagrams of devices in accordance with additional embodiments of the present invention.

Turning now to FIG. 5, an alternative 70 to the circuit of FIG. 4A is illustrated in electrical schematic diagram form. In accordance with this version four pairs of conductors couple a first port 72 to a second port 74 in a dongle device providing accessory power at a third port 76. The 7-8 pair and the 4-5 pair are wired straight through from first port 72 to second port 74 as shown. The 3-6 pair is, in one embodiment, the transmit pair in a 10/100 Base T implementation and carries the 48V return inline power signal and data and has a center-tapped magnetic device T1 (such as a transformer or appropriate inductors) disposed in the transmit pair between first port 72 and second port 74. Pin 6 of the magnetic device T1 is coupled to control circuitry 78 at node 80, then through a current sensor 81 (such as a current sense resistor or other form of current sensor) to node 82 and then through a diode 84 to node 86. Power used by third port 76 will have its current measured by sensor 81. Switch 88 under control of control circuitry 78 and node 86 provide power to third port 76 which can be used, for example, to power an accessory device such as a portable telephone, small computing device, or the like. Pin 4 of magnetic device T1 is coupled through a switch 90 and a current sensor 92 to the control circuitry 78. An optional magnetic device T2 (which may be a center-tapped transformer or inductors as described above in connection with magnetic device T1) is coupled to the 1-2 pair which (in the IEEE 802.3af standard) is the −48 VDC inline power leg. Inline power is provided to the third port 76 by closing switch 88 (it may be a normally closed switch). If a keyed connector is used it may be possible to eliminate switch 88. If the control circuitry 78 sees that power is applied and then the current in current sensor 92 goes to zero (device at second port 74 is off or disconnected) while current is still being used by third port 76 then it forces normally closed switch 90 to open making sure that a "hot cable" situation is not created at second port 74 by removing the inline power to second port 74. To provide inline power again to second port 74 the control circuitry 78 must identify the presence of an appropriate identity network across the 1-2 pair and the 3-6 pair. This may be achieved, for example, by control circuitry 78 reducing the applied voltage and closing switch 90 to carry out a conventional inline power discovery process which may also be followed up by a classification process, if desired in the particular application.

Figure 6:
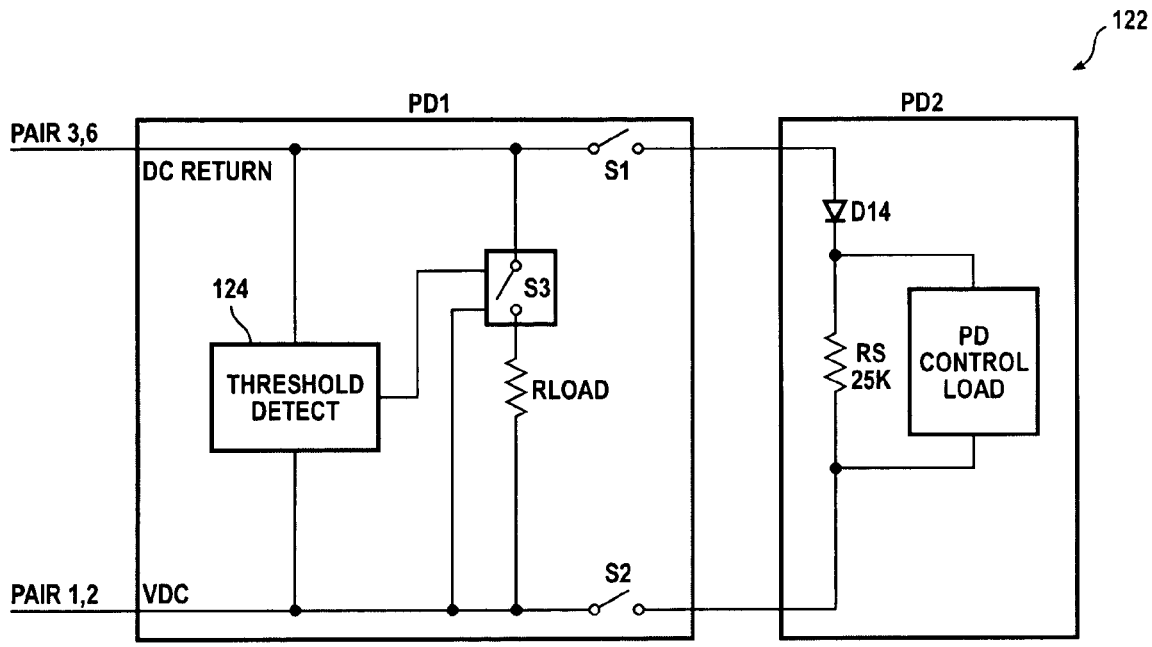

Turning now to FIG. 6 an electrical schematic diagram of a section 122 of a wired data telecommunications network is illustrated. Section 122 includes a first PD (PD1) and a second PD (PD2) both wired across pair 1-2 and pair 3-6 of the wired data telecommunications network. Switches S1 and S2 are provided to decouple PD2 from PD1 when they are open. In this embodiment of the invention, PD2 presents the identity network (the 25K resistor). If PD2 were not present (unplugged) PD1 could pull a small voltage at a small current under idle conditions (up to about 5V at a few mA in one embodiment) which could be used to power some low power electronics, charge a battery, or the like. When switch S3 of D2 is closed then the PD1 is powered with this low power signal (or whatever is available across the two pairs). If PD2 is then plugged in the threshold detect circuit 124 can sense the presence of discovery and classification voltages and open S3 to avoid undesirable interactions between PD1 and the discovery/classification process for PD2. Once regular inline power is again available, S3 may be closed again. As long as a minimum amount of power is drawn, current will continue to flow. In the IEEE 802.3af standard this minimum is about 10 mA. If it drops below that level, inline power will turn off. This could happen if PD2 were uncoupled from PD1. If PD1 wanted to continue drawing high-voltage inline power in the absence of PD2 and pull more than about 10 mA of it, then it would have to open switches S1 and S2 to avoid a hot cable situation.

Figure 7:
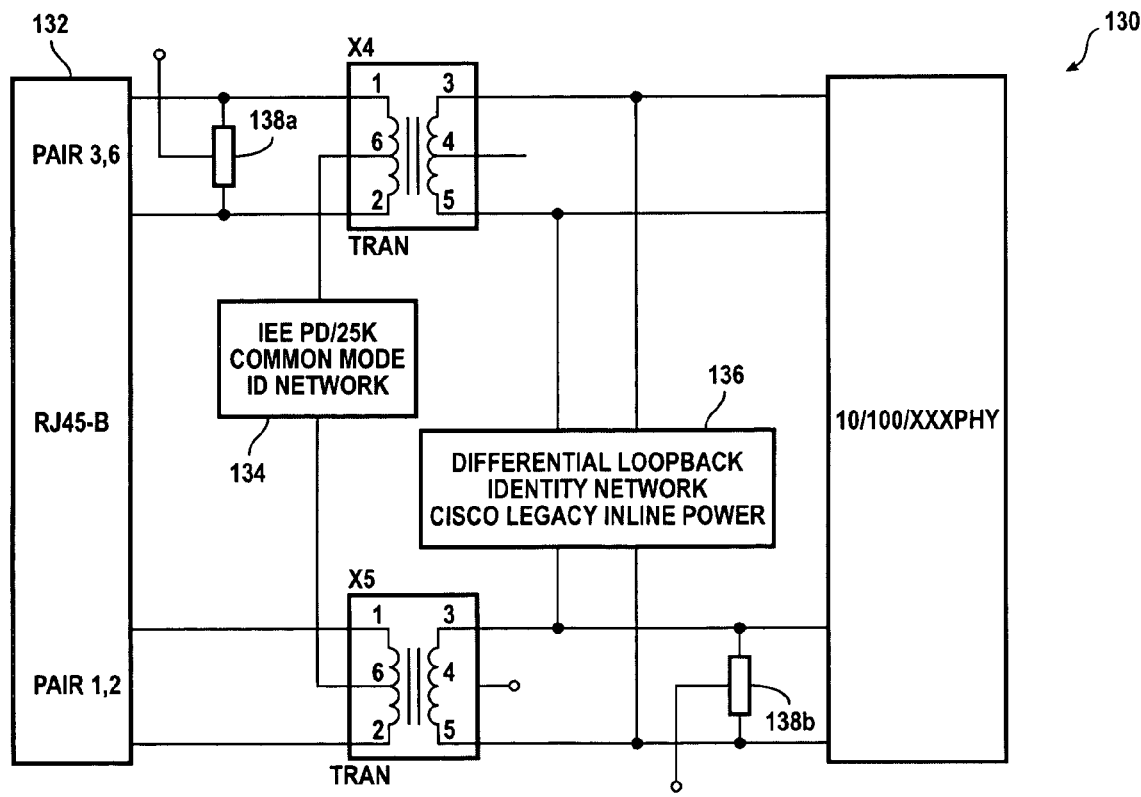

Turning now to FIG. 7 an electrical schematic/block diagram illustrates implementation of multiple identity networks in a wired data telecommunications network segment 130. In this embodiment, the connector block 132 is the port of the PD. These identity networks include the common mode IEEE 802.3af standard identity network, i.e., a 25,000-ohm resistance 134 disposed across the two pairs of conductors via the center-taps of corresponding magnetic devices; differential loop back identity networks 136 (also known as Cisco Legacy Inline Power); and one pair identity networks 138a and 138b whereby a discovery process takes place on a single pair at a time and sets up the inline power relationship between the PSE and the PD on a pair by pair basis.

Identity network 134 may be passive, e.g., a fixed resistance, or, it may be active. An active identity network is used when power is already applied to an existing PD and a new PD is coupled which requires inline power to be shared with the existing PD that is already coupled on the same pair of conductors. Such an active identity network would need to modulate the current of the inline power supply to identify itself and then receive permission from the PSE to turn its load on, thus drawing inline power and sharing the inline power being delivered to the already active PD. Such an active identity network would help to prevent a new device to cause the shut down of an already-powered device in the case that there were insufficient inline power resources available to power both the already active device and the new device. The permission from the PSE may take on the form of a voltage modulation that such a PD may decode before it presents its power load to the PSE, or it may take on the form of a PD to PD communication via other means such as a conventional wired or wireless connection between the respective PDs. A PD may have multiple identity networks at the same time. The active identity network code which may be a series of current pulses acts as an identity network and may supply the attached PSE with the power requirement for the PD so that the PSE may appropriately allocate its available inline power resources.

Figure 8:
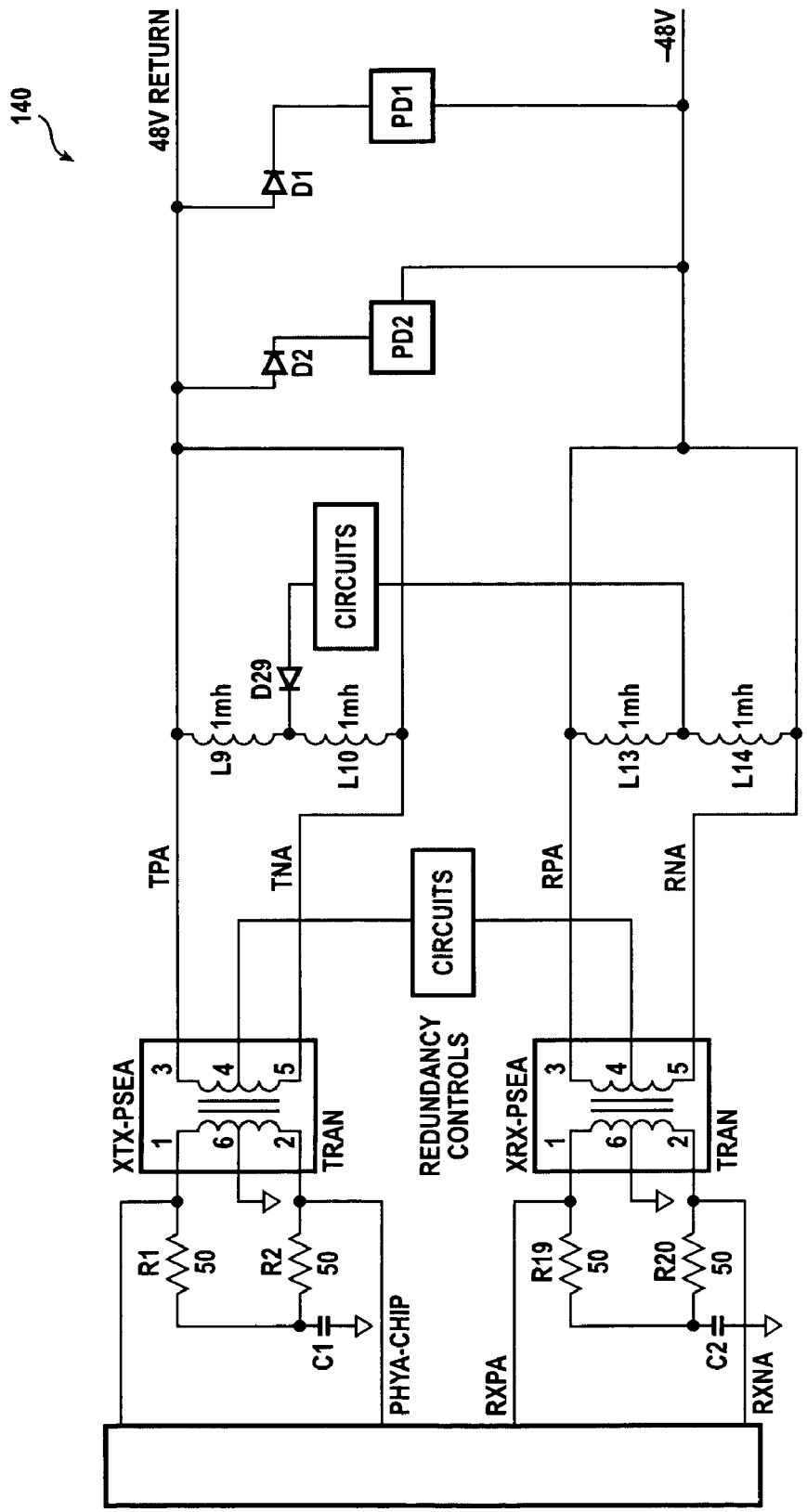

FIG. 8 illustrates a wired data telecommunications network segment 140 which may be implemented with any identity network scheme to provide inline power to PD1 and PD2. The diodes D2 and D1 (associated, respectively with PD2 and PD1). Note that in this figure the circuitry feeding the PDs is shown as single lines rather than as conductor pairs with center-tapped magnetics providing the inline power. This is because data communication is not required to PD2 and PD1 and, accordingly, the pairs have been shorted together as shown. Note that data paths (wired or wireless) may be provided between the PD1 and PD2 and, potentially, the PSE circuitry which could convey information such as power needs and the like.

Figure 9:
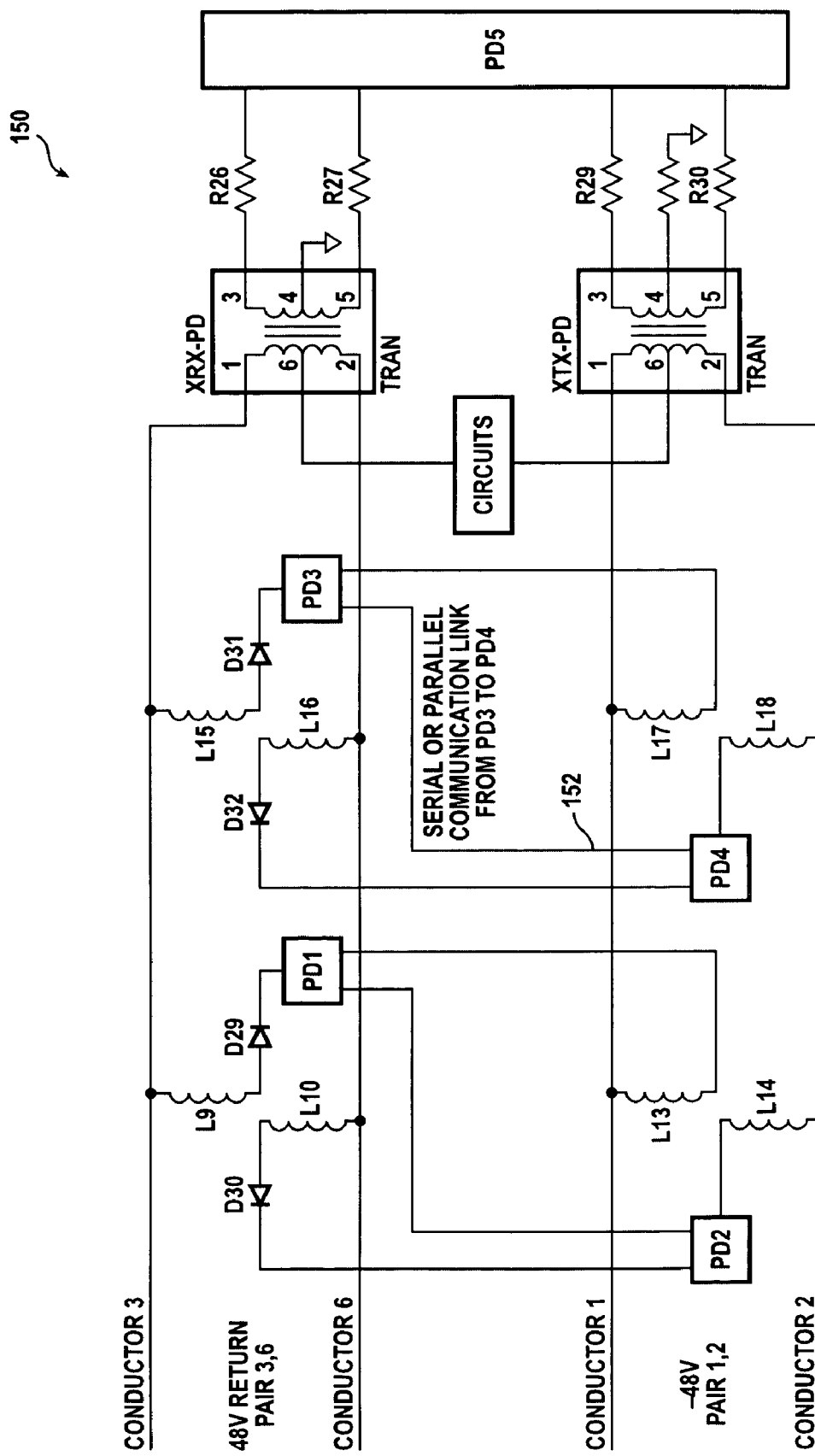

FIG. 9 shows an variation 150 of the circuit of FIG. 8 without shorting the pairs together. In this embodiment, PD1 and PD2 are powered between the two pairs of conductors. PD3 and PD4 are likewise powered but also include an explicit data communication path 152 between them. This can be implemented in a wired fashion or wirelessly and if wired it may (or may not) make use of the existing pairs of conductors coupling the two devices. PD5 is also provided at the end of the network segment. Note that the use of autotransformer circuits (center-tapped pair of inductors) rather than full transformers saves on inductance. The circuit can support up to a few hundred millihenries of inductance. Inductors contribute less effective inductance than do autotransformer circuits since two PD per pair of inductors may be supported vs. one PD per center tap of an autotransformer. It is important to keep the current relatively balanced in the conductors so that more current does not flow through one leg of the transformer than the other. At high enough currents and imbalances this can cause saturation in the magnetic devices and thereby induce a condition known as droop whereby the data pulses are deformed. Compensation may be provided by inducing a countering bias current in the opposite leg to rebalance the current.

In these embodiments if one PD is powered already, the second PD would need to signal the PSE that it is present and needs power as well. This communication may be accomplished in at least three ways. First, the PD would present a differential signature similar to that used in the Cisco legacy inline power scheme described, for example, in U.S. Pat. No. 6,804,351. Second, the PD would present a single-pair-based differential signature that can be detected using time domain reflectometers (TDRs) already built into the PHYs at the switch. Alternatively a differential signal generated at the switch could be manipulated by the PD into a signal detectable at the switch until the switch applies power and causes the manipulated signal to stop. This may be implemented, for example, with a zener diode in series with pair of 1000-ohm resistors, a capacitor, diodes, or any other identity network that allows the PD to be recognized. Third, the PD could simply pull some minimum initial power at 48 VDC through a keyed connector (one that cannot be coupled to the wrong device due to mechanical constraints—like those on portable phones, for example) and initiate common-mode communications with the PSE to obtain power.

Figure 10A:
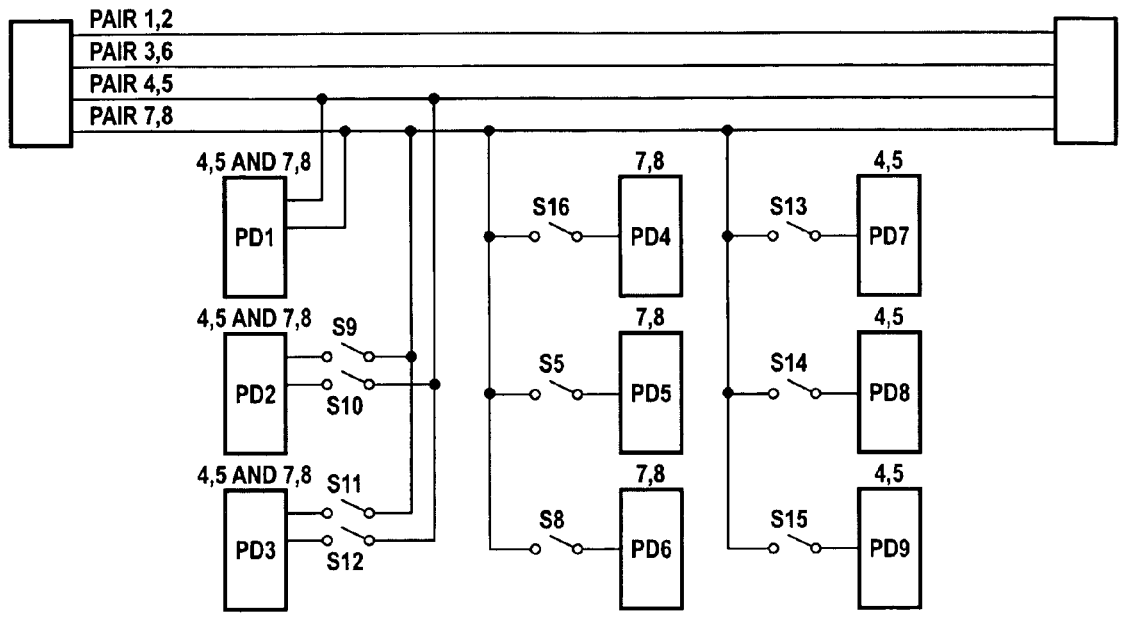
FIGS. 10A, 10B and 10C are electrical schematic diagrams of multiple PD configurations in accordance with embodiment of the present invention.
Figure 10B:
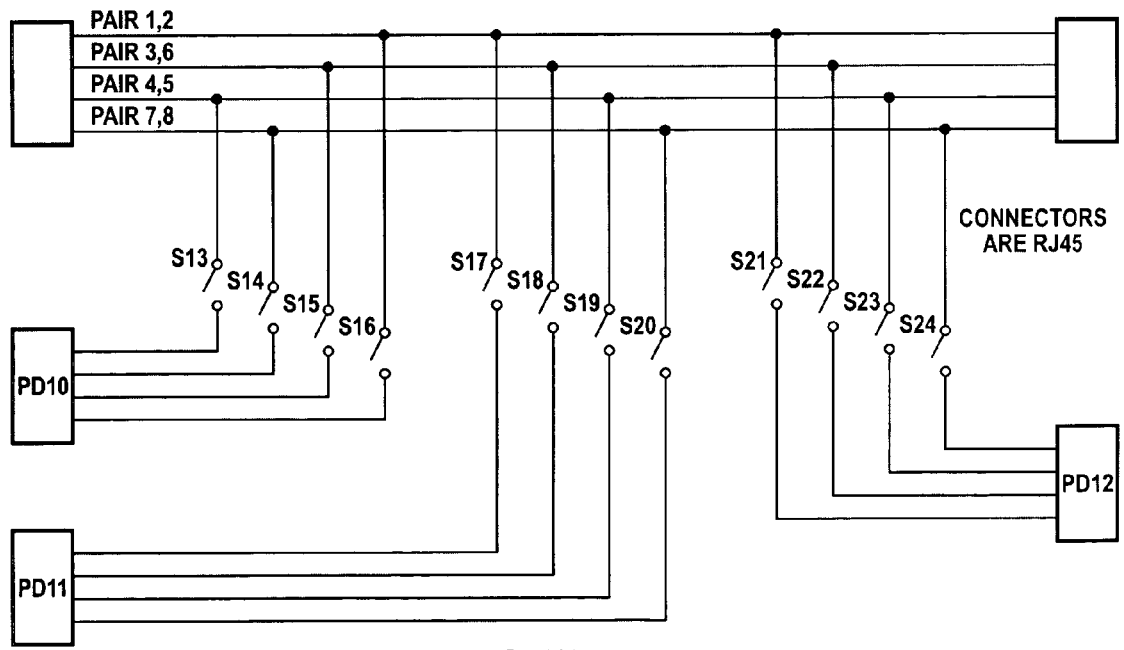
Figure 10C:
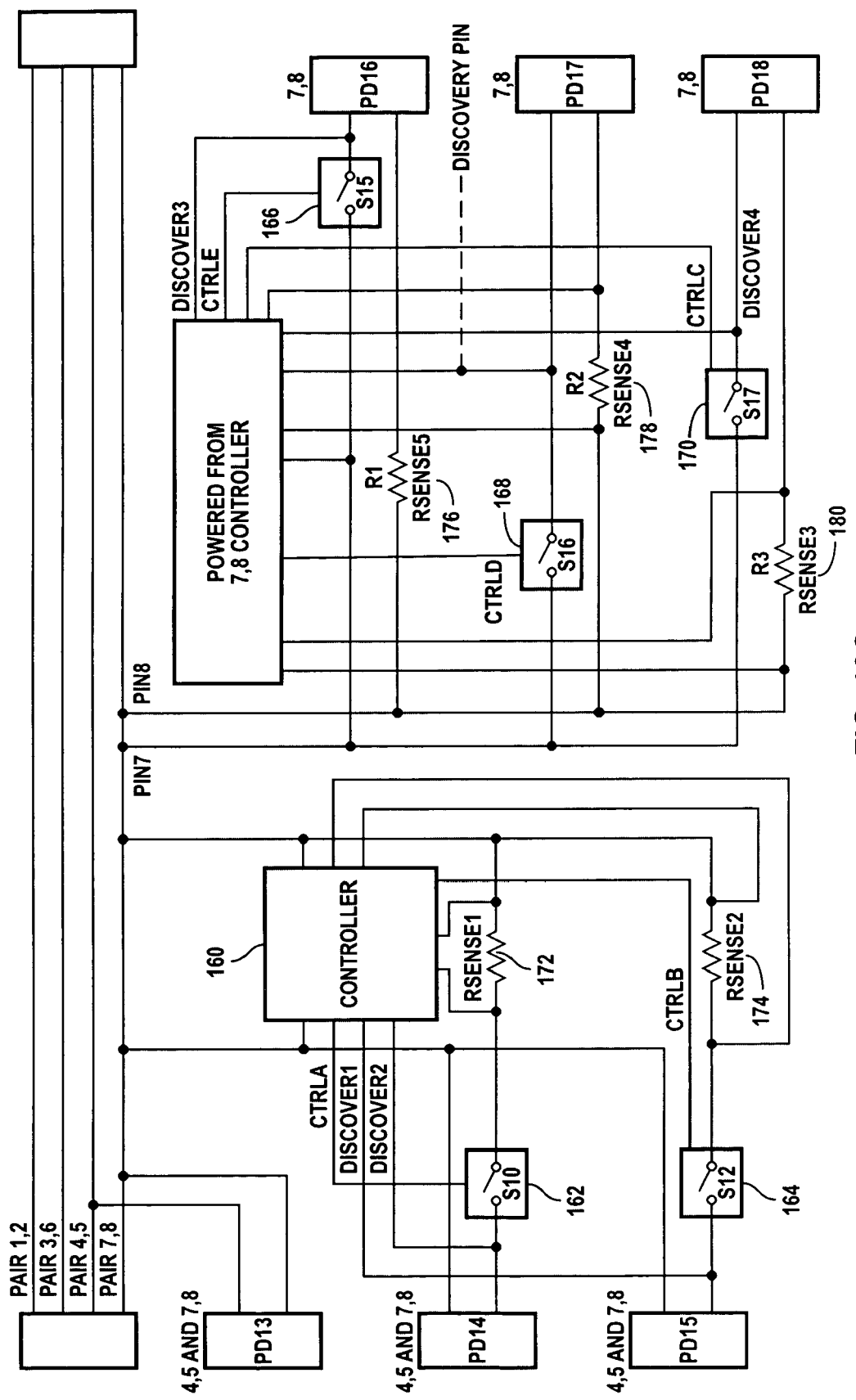

FIG. 10A illustrates an embodiment of the present invention where a number of PD blocks PD1-PD9 are coupled to one or more pairs and may be coupled through switches as are PD2-PD9. To avoid hot cable conditions (power to a cable not necessarily having an appropriate PD on the end of it) discovery is required before permitting a switch to close and if current drops to zero or near zero, the switch opens and requires another successful discovery cycle in order to close again. FIG. 10B is much the same but uses more pairs of conductors to provide power and/or data to PD10-PD12. FIG. 10C illustrates powering PD13-PD18. PD14-PD18 use controllers 160 or 162 to open switches 162, 164, 166, 168, 170 to PD14, PD15, PD16, PD17 and PD18 in the absence of sensed current with current sensors 172, 174, 176, 178, 180, respectively. Controller 160 also conducts discovery and optionally classification to close these switches.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method for managing an inline power relationship between a first device, a second device and a third device in a wired data telecommunications network, the first device configured as power sourcing equipment (PSE), the second device having a first power requirement and configured as a powered device (PD) and coupled via at least a first pair of conductors to the first device, and the third device having a second power requirement and coupled via at least a second pair of conductors to the second device, the method comprising:

communicating from the third device to the second device a representation of a magnitude of the second power requirement;

calculating a representation of a combination of the first and second power requirements; and communicating a representation of the combination to the first device;

wherein:

communicating from the third device to the second device a representation of a magnitude of the second power requirement comprises communicating from the third device to the second device the magnitude of the second power requirement needed by the third device for operation; and calculating the representation of the combination of the first and second power requirements comprises calculating the combination of the first power requirement as needed by the second device for operation and the second power requirement as needed by the third device for operation; and further comprising receiving, by the second device, the combination of the first and second power requirements from the first device.

2. The method of claim 1, wherein the communicating from the third device takes place over the at least a second pair of conductors.

3. The method of claim 1, wherein the communicating from the third device takes place over a wireless link.

4. The method of claim 1, wherein the calculating takes place at the second device.

5. The method of claim 1, wherein the communicating the representation of the combination takes place over the at least a first pair of conductors.

6. The method of claim 1, wherein the communicating the representation of the combination takes place over a wireless link.

7. The method of claim 1, further comprising:
storing a representation of the magnitude of the second power requirement in a first memory store of the second device.

8. The method of claim 1, further comprising:
storing a representation of the combination of the first and second power requirements in a memory store of the second device.

9. The method of claim 7, further comprising:
storing a representation of the combination of the first and second power requirements in a second memory store of the second device.

10. A method for providing inline power from a first device to a second device and a third device in a wired data telecommunications network, the method comprising:
coupling the first device and the second device with a first pair of conductors and a second pair of conductors, the first device configured as power sourcing equipment (PSE), the second device configured as a powered device (PD);
presenting an identity network characteristic to the PSE;
receiving inline power from the PSE in response to the PSE detecting the identity network characteristic;
tapping power from the first pair of conductors and the second pair of conductors to provide inline power received from the PSE to the third device; and
when tapping power from the first pair of conductors and the second pair of conductors to provide inline power received from the PSE to the third device, interrupting inline power flow from the first and second pairs of conductors to the second device when current draw from the second device drops below a predetermined threshold.

11. The method of claim 10, further comprising:
providing power flow to the third device in response to a manual input signal.

12. The method of claim 10, further comprising:
providing power flow to the third device through a keyed connector.

13. An adapter for receiving data and inline power from a first connector adapted to be coupled to a port in a wired data telecommunications network and providing data and inline power to a second connector and power to a third connector, the adapter comprising:
a first connector for coupling the adapter to a power sourcing equipment (PSE) device of a wired data telecommunications network having at least two pairs of conductors;
a second connector for coupling the adapter to a second device;
a third connector for coupling the adapter to a third device;
a first power tap circuit coupled to a first of the at least two pairs of conductors for receiving a first direct current (DC) voltage;
a second power tap circuit coupled to a second of the at least two pairs of conductors for receiving a second DC voltage;
the difference between the first voltage and the second voltage being a difference voltage;
a controller coupled to receive the first voltage and the second voltage and to apply the difference voltage to an output circuit including the third connector; and
switches in line with each of the conductors of the at least two pairs of conductors, a state of the switches controlled by the output circuit so that the switches are open if power is being delivered to the third connector and no powered device has been identified as coupled to the second connector.

14. The adapter of claim 13, wherein:
the output circuit includes a DC-DC converter for converting the difference voltage to another DC voltage.

15. The adapter of claim 13, wherein:
the output circuit contains only the third connector and conductors coupling the third connector to the controller.

16. The adapter of claim 13, wherein:
the output circuit includes a switch controlled by the controller and controlling whether or not power is available at the third connector.

17. The adapter of claim 13, further comprising:
a control in communication with the controller, activation of the control causing the controller to apply power to the third connector.

18. The adapter of claim 13, further comprising:
switches in line with each of the conductors of the at least two pairs of conductors, a state of the switches controlled by the controller so that the switches are closed if a device is coupled to the second connector and no power is being directed to the third connector.

19. The adapter of claim 13, further comprising:
switches in line with each of the conductors of the at least two pairs of conductors, a state of the switches controlled by the controller so that the switches are open if power is being delivered to the third connector and no powered device has been identified as coupled to the second connector.

20. An apparatus for managing an inline power relationship between a first device, a second device and a third device in a wired data telecommunications network, the first device configured as power sourcing equipment (PSE), the second device having a first power requirement and configured as a powered device (PD) and coupled via at least a first pair of conductors to the first device, and the third device having a second power requirement and coupled via at least a second pair of conductors to the second device, the apparatus comprising:
means for communicating from the third device to the second device a representation of a magnitude of the second power requirement;
means for calculating a representation of a combination of the first and second power requirements; and
means for communicating a representation of the combination to the first device
wherein:
means for communicating from the third device to the second device a representation of a magnitude of the second power requirement comprises means for communicating from the third device to the second device the magnitude of the second power requirement needed by the third device for operation, and
means for calculating the representation of the combination of the first and second power requirements comprises means for calculating the combination of the first power requirement as needed by the second device for operation and the second power requirement as needed by the third device for operation; and further comprising means for receiving, by the second device, the combination of the first and second power requirements from the first device.

21. The apparatus of claim 20, wherein the means for communicating from the third device takes place over the at least a second pair of conductors.

22. The apparatus of claim 20, wherein the means for communicating from the third device takes place over a wireless link.

23. The apparatus of claim 20, wherein the means for calculating takes place at the second device.

24. The apparatus of claim 20, wherein the means for communicating the representation of the combination takes place over the at least a first pair of conductors.

25. The apparatus of claim 20, wherein the means for communicating the representation of the combination takes place over a wireless link.

26. The apparatus of claim 20, further comprising:
means for storing a representation of the magnitude of the second power requirement in a first memory store of the second device.

27. The apparatus of claim 20, further comprising:
means for storing a representation of the combination of the first and second power requirements in a memory store of the second device.

28. The apparatus of claim 26, further comprising:
means for storing a representation of the combination of the first and second power requirements in a second memory store of the second device.

29. An apparatus for providing inline power from a first device to a second device and a third device in a wired data telecommunications network, the apparatus comprising:
means for coupling the first device and the second device with a first pair of conductors and a second pair of conductors, the first device configured as power sourcing equipment (PSE), the second device configured as a powered device (PD);
means for presenting an identity network characteristic to the PSE;
means for receiving inline power from the PSE in response to the PSE detecting the identity network characteristic;
means for tapping power from the first pair of conductors and the second pair of conductors to provide inline power received from the PSE to the third device; and
means for interrupting inline power flow from the first and second pairs of conductors to the second device when current draw from the second device drops below a predetermined threshold when tapping power from the first pair of conductors and the second pair of conductors to provide inline power received from the PSE to the third device.

30. The apparatus of claim 29, further comprising:
means for providing power flow to the third device in response to a manual input signal.

31. The apparatus of claim 29, further comprising:
means for providing power flow to the third device through a keyed connector.

32. An adapter for receiving data and inline power from a first connector adapted to be coupled to a port in a wired data telecommunications network and providing data and inline power to a second connector and power to a third connector, the adapter comprising:
a first coupling means for coupling the adapter to a power sourcing equipment (PSE) device of a wired data telecommunications network having at least two pairs of conductors;
a second coupling means for coupling the adapter to a second device;
a third coupling means for coupling the adapter to a third device;
a first means for tapping power from the first of the at least two pairs of conductors for receiving a first direct current (DC) voltage;
a second means for tapping power from the second of the at least two pairs of conductors for receiving a second DC voltage;
the difference between the first voltage and the second voltage being a difference voltage;
means for applying the difference voltage to an output circuit including the third coupling means; and
switching means in line with each of the conductors of the at least two pairs of conductors, a state of the switching means controlled by the means for applying the difference voltage so that the switching means are open if power is being delivered to the third coupling means and no powered device has been identified as coupled to the second coupling means.

33. The adapter of claim 32, wherein:
the output circuit includes means for converting the difference voltage to another DC voltage.

34. The adapter of claim 32, wherein:
the output circuit contains only the third coupling means and conductors coupling the third coupling means to the means for applying.

35. The adapter of claim 32, wherein:
the adapter includes means for controlling whether or not power is available at the third coupling means.

36. The adapter of claim 32, further comprising:
manually controllable means for causing the controller to apply power to the third connector.

37. A system for managing an inline power relationship between a first device, a second device and a third device in a wired data telecommunications network, the first device configured as power sourcing equipment (PSE), the second device having a first power requirement and configured as a powered device (PD) and coupled via at least a first pair of conductors to the first device, and the third device having a second power requirement and coupled via at least a second pair of conductors to the second device, the system comprising:
circuitry for communicating from the third device to the second device a representation of a magnitude of the second power requirement;
circuitry for calculating a representation of a combination of the first and second power requirements; and
circuitry for communicating a representation of the combination to the first device;
wherein:
circuitry for communicating from the third device to the second device a representation of a magnitude of the second power requirement comprises circuitry for communicating from the third device to the second device the magnitude of the second power requirement needed by the third device for operation, and
circuitry for calculating the representation of the combination of the first and second power requirements comprises circuitry for calculating the combination of the first power requirement as needed by the second device for operation and the second power requirement as needed by the third device for operation; and
further comprising circuitry for receiving, by the second device, the combination of the first and second power requirements from the first device.

38. The system of claim 37, wherein the circuitry for communicating from the third device takes place over the at least a second pair of conductors.

39. The system of claim 37, wherein the circuitry for communicating from the third device takes place over a wireless link.

40. The system of claim 37, wherein the circuitry for calculating takes place at the second device.

41. The system of claim 37, wherein the circuitry for communicating the representation of the combination takes place over the at least a first pair of conductors.

42. The system of claim 37, wherein the circuitry for communicating the representation of the combination takes place over a wireless link.

43. The system of claim 37, further comprising:
circuitry for storing a representation of the magnitude of the second power requirement in a first memory store of the second device.

44. The system of claim 37, further comprising:
circuitry for storing a representation of the combination of the first and second power requirements in a memory store of the second device.

45. The system of claim 43, further comprising:
circuitry for storing a representation of the combination of the first and second power requirements in a second memory store of the second device.

46. A system apparatus for providing inline power from a first device to a second device and a third device in a wired data telecommunications network, the system comprising:
circuitry for coupling the first device and the second device with a first pair of conductors and a second pair of conductors, the first device configured as power sourcing equipment (PSE), the second device configured as a powered device (PD);
circuitry for presenting an identity network characteristic to the PSE;
circuitry for receiving inline power from the PSE in response to the PSE detecting the identity network characteristic;
circuitry for tapping power from the first pair of conductors and the second pair of conductors to provide inline power received from the PSE to the third device; and
circuitry for interrupting inline power flow from the first and second pairs of conductors to the second device when current draw from the second device drops below a predetermined threshold when tapping power from the first pair of conductors and the second pair of conductors to provide inline power received from the PSE to the third device.

47. The system of claim 46, further comprising:
circuitry for providing power flow to the third device in response to a manual input signal.

48. The system of claim 46, further comprising:
circuitry for providing power flow to the third device through a keyed connector.

49. An adapter for receiving inline power from a first connector adapted to be coupled to a port in a wired data telecommunications network and providing inline power to a second connector and power to a third connector, the adapter comprising:
a first connector for coupling the adapter to a power sourcing equipment (PSE) device of a wired data telecommunications network having at least two pairs of conductors;
a second connector for coupling the adapter to a second device;
a third connector for coupling the adapter to a third device;
a first power tap coupled to receive a first direct current (DC) voltage from a first of the at least two pairs of conductors;
a second power tap coupled to receive a second DC voltage from a second of the at least two pairs of conductors;
the difference between the first voltage and the second voltage being a difference voltage; an output circuit including the third connector and adapted to receive the first voltage and the second voltage and provide power to the third connector; and
switches in line with each of the conductors of the at least two pairs of conductors, a state of the switches controlled by the output circuit so that the switches are open if power is being delivered to the third connector and no powered device has been identified as coupled to the second connector.

50. The adapter of claim 49, wherein:
the output circuit includes a DC-DC converter for converting the difference voltage to another DC voltage.

51. The adapter of claim 49, wherein:
the output circuit contains only the third connector and conductors coupling the third connector to the controller.

52. The adapter of claim 49, wherein:
the output circuit includes a switch controlled by the controller and controlling whether or not power is available at the third connector.

53. The adapter of claim 49, further comprising:
a control in communication with the output circuit, activation of the control causing the output circuit to apply power to the third connector.

54. The adapter of claim 49, further comprising:
switches in line with each of the conductors of the at least two pairs of conductors, a state of the switches controlled by the output circuit so that the switches are closed if a device is coupled to the second connector and no power is being directed to the third connector.

55. An adapter for receiving inline power from a first connector adapted to be coupled to a port in a wired data telecommunications network and providing data and inline power to a second connector and power to a third connector, the adapter comprising:
a first coupler adapted to couple the adapter to a power sourcing equipment (PSE) device of a wired data telecommunications network having at least two pairs of conductors;
a second coupler adapted to couple the adapter to a second device;
a third coupler adapted to couple the adapter to a third device;
a first power tap adapted to receive a first direct current (DC) voltage from the first of the at least two pairs of conductors;
a second power tap adapted to receive a second DC voltage from the second of the at least two pairs of conductors;
the difference between the first voltage and the second voltage being a difference voltage; and
an output circuit including the third coupler and adapted to receive the first voltage and the second voltage and provide power to the third connector; and
switches in line with each of the conductors of the at least two pairs of conductors, a state of the switches controlled by the output circuit so that the switches are open if power is being delivered to the third connector and no powered device has been identified as coupled to the second connector.

56. The adapter of claim 55, wherein:
the output circuit includes a converter adapted to convert the difference voltage to another DC voltage.

57. The adapter of claim 55, wherein:
the adapter includes a circuit adapted to control whether or not power is available at the third coupler.

58. The adapter of claim 55, further comprising:
a manually controllable control for causing the adapter to apply power to the third connector.

59. A method for managing an inline power relationship between a first device, a second device and a third device in a wired data telecommunications network, the first device configured as power sourcing equipment (PSE), the second device having a first power requirement and configured as a powered device (PD) and coupled via at least a first pair of conductors to the first device, and the third device having a second power requirement and coupled via the least a first pair of conductors to the second device, the method comprising:
powering the second device with inline power;
subsequently coupling the third device to the at least a first pair of conductors;
using an active identity network at the third device to communicate the second power requirement to the first device;
allocating at the first device the inline power necessary to meet the second power requirement;
communicating from the first device to the third device a confirmation of inline power allocation; and
responsive to the confirmation, presenting a load at the third device to the at least a pair of conductors.

60. The method of claim 59 wherein the third device also includes a passive identity network.

61. An apparatus for managing an inline power relationship between a first device, a second device and a third device in a wired data telecommunications network, the first device configured as power sourcing equipment (PSE), the second device having a first power requirement and configured as a powered device (PD) and coupled via at least a first pair of conductors to the first device, and the third device having a second power requirement and coupled via the least a first pair of conductors to the second device, the apparatus comprising:
means for powering the second device with inline power;
means for subsequently coupling the third device to the at least a first pair of conductors;
means for using an active identity network at the third device to communicate the second power requirement to the first device;
means for allocating at the first device the inline power necessary to meet the second power requirement;
means for communicating from the first device to the third device a confirmation of inline power allocation; and
means responsive to the confirmation for presenting a load at the third device to the at least a pair of conductors.

62. The apparatus of claim 61 wherein the third device also includes a passive identity network.

63. The method of claim 1, wherein communicating from the third device to the second device the representation of the magnitude of the second power requirement needed by the third device for operation comprises using an active identity network at the third device to communicate the second power requirement to the first device.

64. The method of claim 63, wherein using the active identity network at the third device to communicate the second power requirement to the first device comprises generating a series of current pulses acting as an active identity code to supply the first device with the power requirement for the third device.

65. The method of claim 1, wherein receiving, by the second device, the combination of the first and second power requirements from the first device comprises receiving, by the second device, the combination of the total amount of power required by the second device and by the third device for operation.

66. The method of claim 65, comprising, of the total amount of power received, providing, by the second device, a second amount of power to the third device as needed by the third device for operation.

* * * * *